(12) United States Patent
Suzuki et al.

(10) Patent No.: US 7,612,815 B2
(45) Date of Patent: *Nov. 3, 2009

(54) OPTICAL SENSOR

(75) Inventors: Yasuhiro Suzuki, Hamamatsu (JP);
Seiichiro Mizuno, Hamamatsu (JP)

(73) Assignee: Hamamatsu Photonics K.K.,
Hamamatsu-shi, Shizuoka (JP)

( * ) Notice: Subject to any disclaimer, the term of this patent is extended or adjusted under 35 U.S.C. 154(b) by 448 days.

This patent is subject to a terminal disclaimer.

(21) Appl. No.: 10/539,068

(22) PCT Filed: Dec. 16, 2003

(86) PCT No.: PCT/JP03/16114
§ 371 (c)(1),
(2), (4) Date: Apr. 20, 2006

(87) PCT Pub. No.: WO2004/056093
PCT Pub. Date: Jul. 1, 2004

(65) Prior Publication Data
US 2006/0227229 A1 Oct. 12, 2006

(30) Foreign Application Priority Data
Dec. 16, 2002 (JP) ............................. 2002-364123

(51) Int. Cl.
*H04N 5/217* (2006.01)
*H04N 3/14* (2006.01)
*H04N 5/335* (2006.01)

(52) U.S. Cl. ...................... 348/302; 348/241; 348/294; 348/308

(58) Field of Classification Search .................. 348/241, 348/302, 308, 294
See application file for complete search history.

(56) References Cited

U.S. PATENT DOCUMENTS
4,902,886 A * 2/1990 Smisko ................... 250/214 R
(Continued)

FOREIGN PATENT DOCUMENTS
EP 0 796 000 9/1997
(Continued)

OTHER PUBLICATIONS

Garverick et al., "A 32-Channel Charge Readout IC for Programmable, Nonlinear Quantization of Multichannel Detector Data," IEEE Journal of Solid-State Circuits, vol. 30, No. 5, May 1995, pp. 533-541.

*Primary Examiner*—David L Ometz
*Assistant Examiner*—Richard M Bemben
(74) *Attorney, Agent, or Firm*—Drinker Biddle & Reath LLP

(57) ABSTRACT

The present invention aims at providing a photodetector which can secure both a good S/N ratio and a high speed. With a photodetector 1, (K×M×N) photodiodes $PD_{k,m,n}$ are arranged in M rows and (K×N) columns in a photodetection unit 10, and processes (electric charge accumulation, CDS, filtering, and A/D conversion) regarding each of the (K×N) photodiodes $PD_{k,m,n}$ (k=1 to K, n=1 to N) of each row are carried out successively at each time T. Meanwhile, each of an electric charge accumulation operation in an integrating circuit $20_{m,n}$, a CDS operation in a CDS circuit $30_{m,n}$, a filtering operation in a filter circuit $40_{m,n}$, and an A/D conversion operation in an A/D converter $50_{m,n}$ is carried out at each time (N×T).

3 Claims, 5 Drawing Sheets

U.S. PATENT DOCUMENTS

| | | | | |
|---|---|---|---|---|
| 5,731,578 A | * | 3/1998 | Mizuno | 250/208.1 |
| 5,892,540 A | * | 4/1999 | Kozlowski et al. | 348/300 |
| 6,002,435 A | * | 12/1999 | Yamamoto et al. | 348/307 |
| 6,031,570 A | * | 2/2000 | Yang et al. | 348/300 |
| 6,075,564 A | * | 6/2000 | Mizuno | 348/294 |
| 6,344,877 B1 | * | 2/2002 | Gowda et al. | 348/245 |
| 6,498,332 B2 | * | 12/2002 | Funakoshi | 250/208.1 |
| 6,606,123 B2 | * | 8/2003 | Mizuno | 348/308 |
| 6,642,501 B2 | * | 11/2003 | Mizuno et al. | 250/214 R |
| 6,670,903 B2 | * | 12/2003 | Fujita et al. | 341/155 |
| 6,700,110 B2 | * | 3/2004 | Mizuno et al. | 250/208.1 |
| 6,757,627 B2 | * | 6/2004 | Mizuno | 702/65 |
| 6,873,364 B1 | * | 3/2005 | Krymski | 348/308 |
| 6,956,607 B2 | * | 10/2005 | Mizuno et al. | 348/308 |
| 6,977,682 B2 | * | 12/2005 | Mizuno et al. | 348/241 |
| 7,286,172 B2 | * | 10/2007 | Mizuno et al. | 348/294 |
| 7,355,642 B2 | * | 4/2008 | Suzuki et al. | 348/294 |
| 7,440,017 B2 | * | 10/2008 | Endo et al. | 348/308 |
| 2002/0051067 A1 | * | 5/2002 | Henderson et al. | 348/241 |
| 2006/0231748 A1 | * | 10/2006 | Suzuki et al. | 250/227.26 |

FOREIGN PATENT DOCUMENTS

| | | |
|---|---|---|
| EP | 1 154 483 | 11/2001 |
| JP | 09-051476 | 2/1997 |
| JP | 09-238286 | 9/1997 |
| JP | 09-270960 | 10/1997 |
| JP | 2000-032342 | 1/2000 |
| JP | 2000-324397 | 11/2000 |
| JP | 2002-051264 | 2/2002 |
| JP | 2002-199282 | 7/2002 |
| WO | WO 01/11870 | 2/2001 |

\* cited by examiner

OPTICAL SENSOR

TECHNICAL FIELD

The present invention relates to a photodetector including a plurality of photodiodes arranged.

BACKGROUND ART

A photodetector is an apparatus comprising a plurality of photodiodes arranged one-dimensionally or two-dimensionally, and an integrating circuit including an amplifier and an integral capacitance part, and may further comprise signal processing circuits subsequent thereto (see for example, Japanese Patent Application Laid-open Gazzete No. H9-270960). With this photodetector, electric charges of amounts that are in accordance with the intensities of light made incident onto the respective photodiodes are output by the photodiodes, these electric charges are accumulated in the integrating capacitance elements, and voltages that are in accordance with the amounts of the accumulated electric charges are output from the integrating circuit. Based on the voltages output from the integrating circuit in accordance with the amounts of electric charges generated at the plurality of photodiodes respectively, the light made incident onto a photodetection surface, on which the plurality of photodiodes are arranged, is detected.

DISCLOSURE OF THE INVENTION

However, in performing photodetection by such a photodetector at high speed, the thermal noise generated at the amplifiers included in the integrating circuit becomes large and this thermal noise causes degradation of the S/N ratio of photodetection. The thermal noise $V_n$ of an amplifier is expressed by the following Equation:

$$V_n = \frac{C_d}{C_f} \sqrt{\frac{8kTB}{3G_m}} \quad (1)$$

In the above, $C_d$ is the junction capacitance value of a photodiode and is the sum of the capacitance values of the wiring from the photodiode to an integrating circuit. $C_f$ is the capacitance value of the integrating capacitance element in the integrating circuit. k is the Boltzmann constant. T is the temperature. B is the frequency bandwidth of the amplifier that is included in the integrating circuit. $G_m$ is the input transistor's transconductance of the amplifier included in the integrating circuit.

Of the parameters appearing at the right side of the above Equation (1), those that contribute to the lowering of thermal noise are B and $G_m$. Though a greater $G_m$ is effective for lowering thermal noise, it increases the consumption power of the amplifier. When the consumption power of the amplifier is high, heat generation becomes problem when a large number of amplifiers are integrated. There is thus a limit to making $G_m$ large. Also, though a smaller B is effective for lowering thermal noise, it lowers the speed of photodetection. It is thus difficult to accomplish high speed of photodetection and improvement of the S/N ratio at the same time.

In order to overcome the problem mentioned above, it is an object of the present invention to provide a photodetector which can secure both a good S/N ratio and a high speed.

This invention's photodetector comprises: (1) (K×M×N) photodiodes $PD_{k,m,n}$ (K being an integer of no less than 2; k being integers of no less than 1 and no more than K; M being an integer of no less than 1; m being integers of no less than 1 and no more than M; N being an integer of no less than 2; and n being integers of no less than 1 and no more than N), each generating electric charges of an amount that is in accordance with an incident light intensity; (2) (M×N) integrating circuits, one of each being provided in correspondence to K photodiodes $PD_{k,m,n}$ (k=1 to K) among the (K×M×N) photodiodes $PD_{k,m,n}$ and each successively inputting and accumulating the electric charges generated at the K photodiodes $PD_{k,m,n}$ (k=1 to K) and outputting a voltage that is in accordance with the amount of the accumulated electric charges; and (3) (M×N) filter circuits, one of each being provided in correspondence to each of the (M×N) integrating circuits and each reducing the thermal noise component contained in the voltage output from the corresponding integrating circuit and outputting the voltage after reduction of the thermal noise component.

With the photodetector of the present invention, for each value of m and each value of n, the electric charges that are respectively generated in accordance with the incidence of light in K photodiodes $PD_{k,m,n}$ (k=1 to K) are successively input and accumulated in a single integrating circuit and a voltage that is in accordance with the amount of the accumulated electric charges is output from the integrating circuit. The thermal noise component that is contained in the voltage output from each integrating circuit is reduced by a filter circuit, and the voltage after reduction of the thermal noise component is output from the filter circuit. Both a good S/N ratio and a high speed can thus be secured with this photodetector.

This invention's photodetector is preferably further equipped with CDS circuits, each being arranged between an integrating circuit and a filter circuit, inputting the voltage output from the integrating circuit, and outputting a voltage expressing the fluctuation of the input voltage over a fixed time. In this case, since the voltage output from each integrating circuit is input into a CDS circuit and the voltage expressing the fluctuation of the input voltage over a fixed time is output from the CDS circuit, the fluctuation of the offset of the amplifier of the integrating circuit can be eliminated by the CDS circuit.

This invention's photodetector is preferably further equipped with A/D converters, each inputting the voltage output from a filter circuit, performing A/D conversion on this voltage, and outputting a digital value that is in accordance with this voltage. In this case, the voltage output from each filter circuit is input into an A/D converter and a digital value that is in accordance with this voltage is output from the A/D converter.

With this invention's photodetector, the (K×M×N) photodiodes $PD_{k,m,n}$ are preferably arranged in M rows and (K×N) columns either two-dimensionally (when M≥2) or one-dimensionally (when M=1), with each photodiode $PD_{k,m,n}$ being positioned at the position of the m-th row and (n+k−1) N)-th column. In this case, the processes (electric charge accumulation and filtering, and where necessary, CDS and A/D conversion) concerning the photodiodes can be carried out in the order of alignment in each column for each row.

BEST MODES FOR CARRYING OUT OF THE INVENTION

In the following, embodiments of the present invention will be explained in detail with reference to the accompanying drawings. In the explanation of the drawings, constituents identical to each other will be referred to with numerals identical to each other without repeating their overlapping descriptions.

Figure 1:
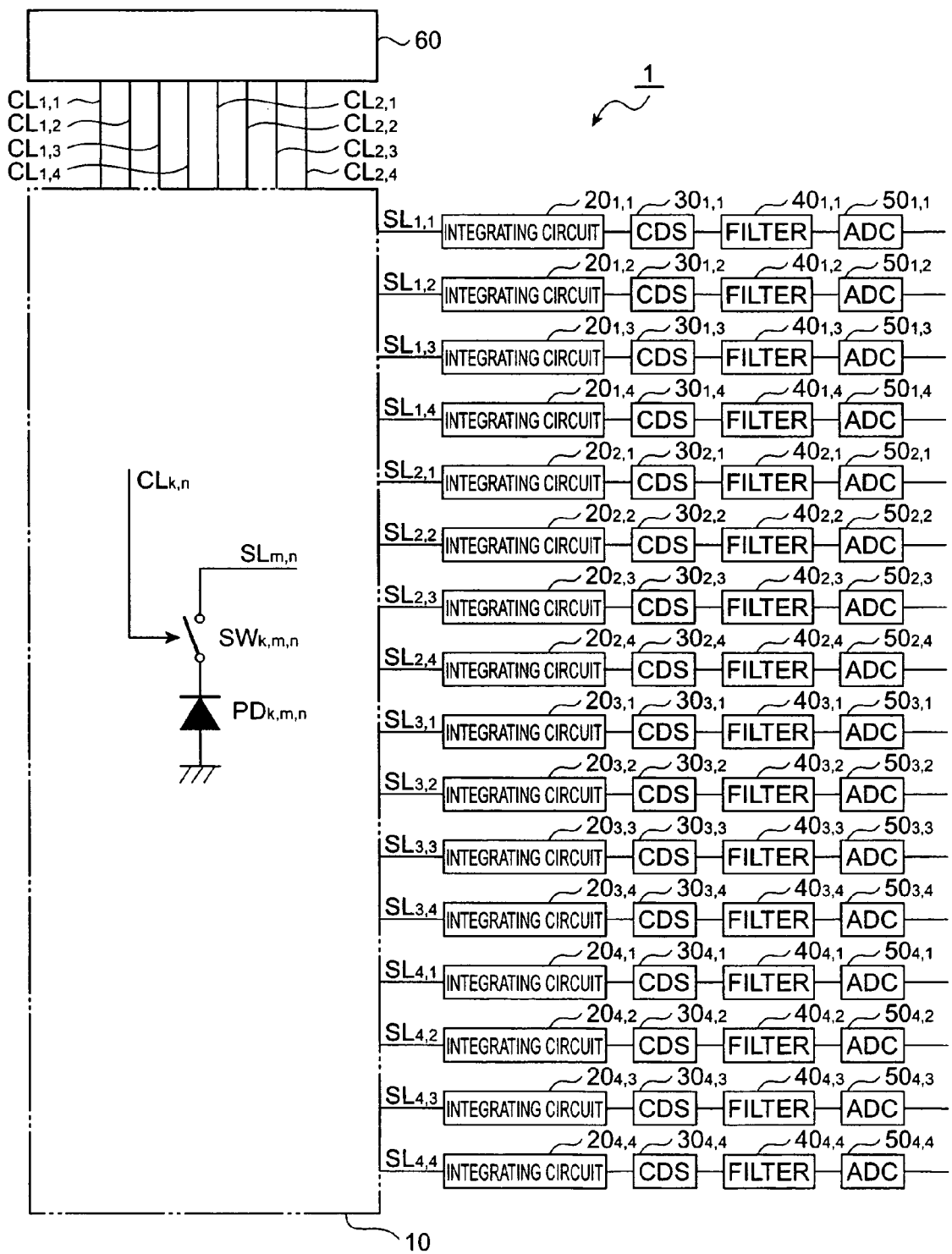
FIG. 1 is an overall diagram of a photodetector 1 in accordance with an embodiment.
Figure 2:
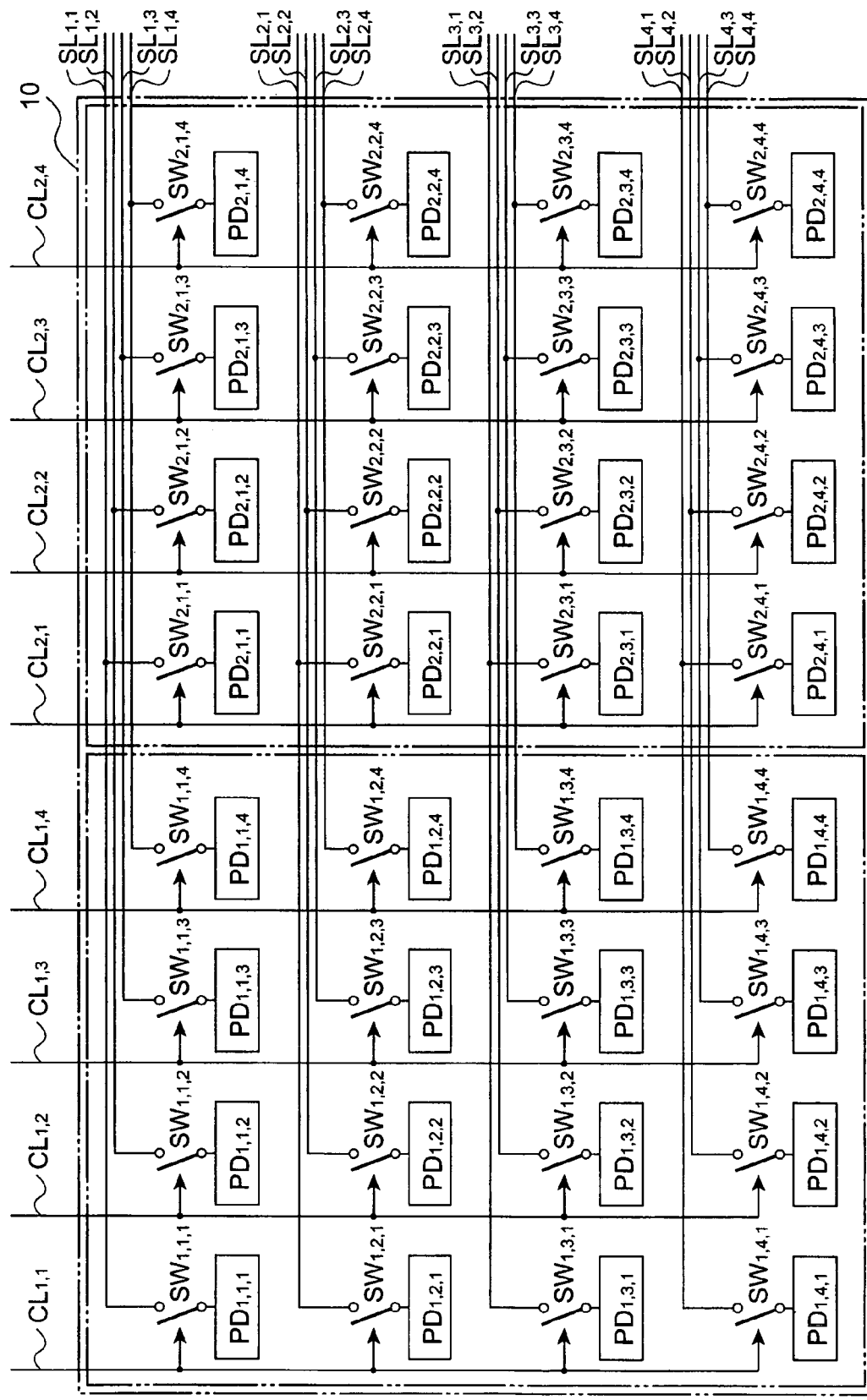
FIG. 2 is a partial diagram of the photodetector 1 in accordance with the embodiment.

FIG. 1 is an overall diagram of a photodetector 1 of the embodiment. FIG. 2 is a partial diagram of photodetector 1 of the embodiment. The details of a photodetection unit 10, shown in FIG. 1 are shown in FIG. 2.

A photodetector 1, which is illustrated in these figures, is equipped with photodetection unit 10, (M×N) integrating circuits $20_{1,1}$ to $20_{M,N}$, (M×N) CDS circuits $30_{1,1}$ to $30_{M,N}$, (M×N) filter circuits $40_{1,1}$ to $40_{M,N}$, (M×N) A/D converters $50_{1,1}$ to $50_{M,N}$, and a control circuit 60. Photodetection unit 10 has (K×M×N) photodiodes $PD_{1,1,1}$ to $PD_{K,M,N}$ and (K×M×N) switches $SW_{1,1,1}$ to $SW_{K,M,N}$. Here, K indicates an integer no less than 2, M indicates an integer no less than 1, and N indicates an integer no less than 2. Also, in regard to k, m, n, which shall be used below, k indicates integers no less than 1 and no more than K, m indicates integers no less than 1 and no more than M, and n indicates integers no less than 1 and no more than N. In FIG. 1 and FIG. 2, K is set to 2 and M and N are both set to 4.

Each photodiode $PD_{k,m,n}$ generates electric charges of an amount that is in accordance with an incident light intensity and accumulates these electric charges in a junction capacitance portion. These (K×M×N) photodiodes $PD_{k,m,n}$ are arranged at equal intervals in M rows and (K×N) columns either two-dimensionally (when M=2) or one-dimensionally (when M=1). Each photodiode $PD_{k,m,n}$ is positioned at the position of the m-th row and the (n+k−1)N)-th column. Switches $SW_{k,m,n}$ are provided in a one-to-one correspondence with respect to photodiodes $PD_{k,m,n}$ and are arranged between $PD_{k,m,n}$ and signal lines $SL_{m,n}$. Each set of K photodiodes $PD_{k,m,n}$ (k=1 to K) is connected via the corresponding switches $SW_{k,m,m}$ to a signal line $SL_{m,n}$. Each signal line $SL_{m,m}$ is connected to an input end of an integrating circuit $20_{m,n}$. The opening/closing of each set of M switches $SW_{k,m,n}$ (m=1 to M) is controlled together by a control signal output to a control line $CL_{k,n}$ from control circuit 60.

Each of integrating circuits $20_{m,n}$ is provided in correspondence to K photodiodes $PD_{k,m,n}$ (k=1 to K), inputs and accumulates the electric charges that are generated respectively at these K photodiodes $PD_{k,m,n}$ (k=1 to K) and arrive successively via switches $SW_{k,m,n}$ and signal line $SL_{m,n}$, and outputs a voltage that is in accordance with the amount of the accumulated electric charges. Each CDS (correlated double sampling) circuit $30_{m,n}$ inputs the voltage output from the corresponding integrating circuit $20_{m,n}$ and outputs a voltage expressing the fluctuation over a fixed time of this voltage.

Each filter circuit $40_{m,n}$ inputs the voltage output from the corresponding CDS circuit $30_{m,n}$, reduces the thermal noise component contained in this voltage, and outputs the voltage after reduction of the thermal noise component. Each filter circuit $40_{m,n}$ is preferably a low-pass filter with filter characteristics that can reduce thermal noise components. Each A/D converter $50_{m,n}$ inputs the voltage output from the corresponding filter circuit $40_{m,n}$, performs A/D conversion of this voltage, and outputs a digital value that is in accordance with this voltage (analog value).

Control circuit 60 outputs control signals for controlling the opening/closing of the respective (K×M×N) switches $SW_{1,1,1}$ to $SW_{K,M,N}$, to control lines $CL_{k,n}$. Control circuit 60 also controls the respective operations of integrating circuits $20_{m,n}$, CDS circuits $30_{m,n}$, and A/D converters $50_{m,n}$.

Figure 3:
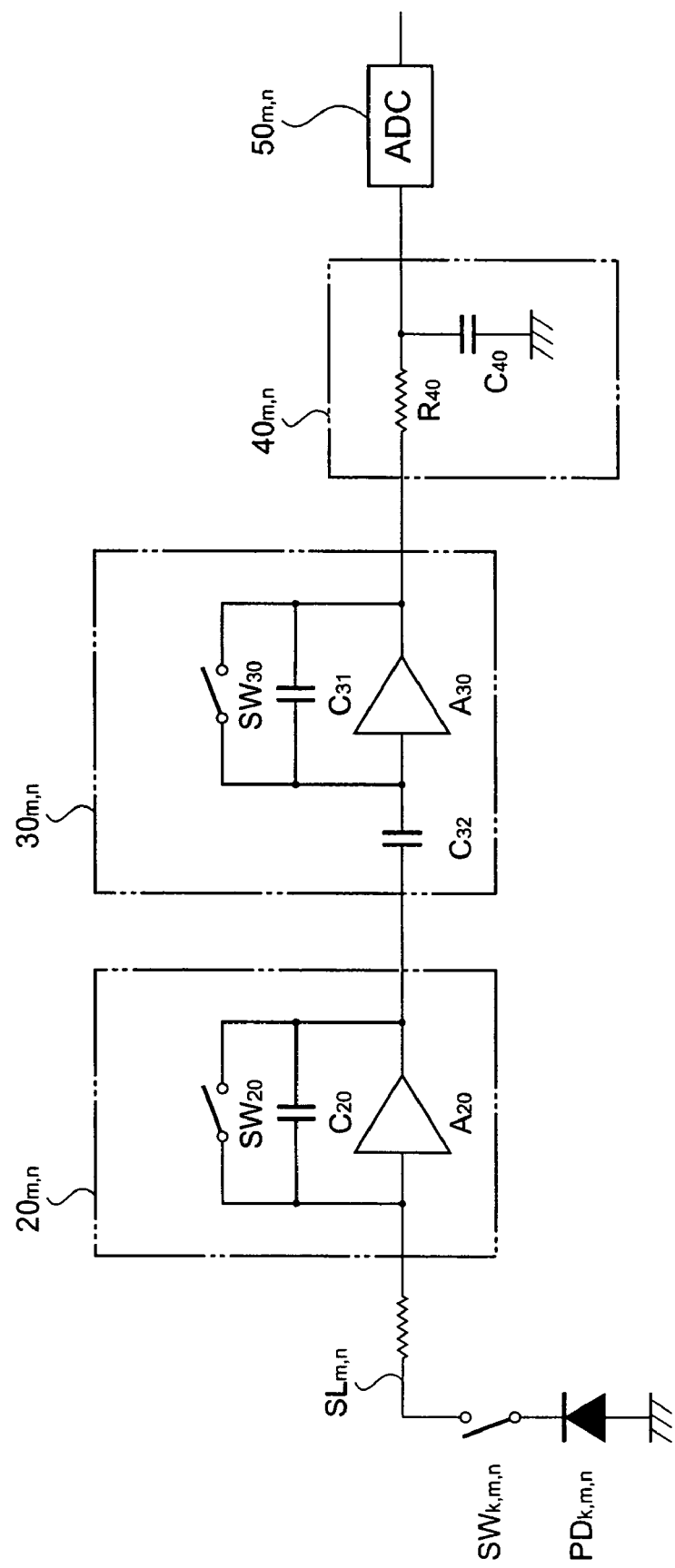
FIG. 3 is a circuit diagram of photodetector 1 of the embodiment.

FIG. 3 is a circuit diagram of photodetector 1 of the present embodiment. For the sake of simplification, just one of each of photodiodes $PD_{k,m,n}$, switches $SW_{k,m,n}$, integrating circuits $20_{m,n}$, CDS circuits $30_{m,n}$, filter circuits $40_{m,n}$, and A/D converters $50_{m,n}$ are shown in the figure.

Integrating circuit $20_{m,n}$ has an amplifier $A_{20}$, an integrating capacitance element $C_{20}$, and a switch $SW_{20}$. The input terminal of amplifier $A_{20}$ is connected to signal line $SL_{m,n}$. Integrating capacitance element $C_{20}$ and switch $SW_{20}$ are arranged in parallel between the input and output terminals of amplifier $A_{20}$. The opening/closing of switch $SW_{20}$ is controlled by control unit 60. When switch $SW_{20}$ is closed, integrating capacitance element $C_{20}$ is discharged and the voltage output from integrating circuit $20_{m,n}$ is initialized. On the other hand, when switch $SW_{20}$ is open, the electric charges arriving via signal line $SL_{m,n}$ are accumulated in the integrating capacitance element $C_{20}$ and a voltage that is in accordance with the amount of electric charges accumulated in this integrating capacitance element $C_{20}$ is output from integrating circuit $20_{m,n}$.

CDS circuit $30_{m,n}$ has an amplifier $A_{30}$, an integrating capacitance element $C_{31}$, a junction capacitance element $C_{32}$, and a switch $SW_{30}$. The input terminal of amplifier $A_{30}$ is connected via junction capacitance element $C_{32}$ to the output terminal of amplifier $A_{20}$ of integrating circuit $20_{m,n}$. Integrating capacitance element $C_{31}$ and switch $SW_{30}$ are arranged in parallel between the input and output terminals of amplifier $A_{30}$. The opening/closing of switch $SW_{30}$ is controlled by control unit 60. When switch $SW_{30}$ is closed, integrating capacitance element $C_{31}$ is discharged and the voltage output from CDS circuit $30_{m,n}$ is initialized. On the other hand, onwards from a time t at which switch $SW_{30}$ is open, electric charges corresponding to the fluctuation of the voltage output from integrating circuit $20_{m,n}$, are accumulated in integrating capacitance element $C_{31}$ and a voltage that is in accordance with the amount of electric charges accumulated in this integrating capacitance element $C_{31}$ is output from CDS circuit $30_{m,n}$.

Filter circuit $40_{m,n}$ has a resistance element $R_{40}$ and a capacitance element $C_{40}$. Resistance element $R_{40}$ is arranged between the input end and the output end of filter circuit $40_{m,n}$ and the output end thereof is connected via capacitance element $C_{40}$ to the ground potential. This filter circuit $40_{m,n}$ acts as a low-pass filter and in term of filter characteristics, the cutoff frequency thereof is in accordance with the resistance value of resistance element $R_{40}$ and the capacitance value of capacitance element $C_{40}$.

The characteristic values of the respective elements in the circuit diagram shown in FIG. 3 are, for example, as follows. That is, the sum of the junction capacitance value $C_d$ of photodiode $PD_{k,m,n}$ and the parasitic capacitance value of signal line $SL_{m,n}$ is 220 pF and the resistance value of signal line $SL_{m,n}$ is 1 kΩ. The capacitance value $C_f$ of integrating capacitance element $C_{20}$ of integrating circuit $20_{m,n}$ is 1.25 pF, the frequency bandwidth B of amplifier $A_{20}$ of integrating circuit $20_{m,n}$ is 1 MHz, and the input transistor's transconductance $G_m$ of amplifier $A_{20}$ is 10 mS. The temperature T is 27° C. In this case, the thermal noise $V_n$ generated at amplifier $A_{20}$ of integrating circuit $20_{m,n}$ is 1210 $\mu V_{rms}$. If the capacitance value of capacitance element $C_{40}$ of filter circuit $40_{m,n}$ is 100 pF and the resistance value of resistance element $R_{40}$ of filter circuit $40_{m,n}$ n is 20 k$\Omega$, the cutoff frequency of the filter characteristics of filter circuit $40_{m,n}$ will be 0.08 MHz and the thermal noise component contained in the voltage output from filter circuit $40_{m,n}$ will be reduced to 724 $\mu V_{rms}$.

Figure 4:
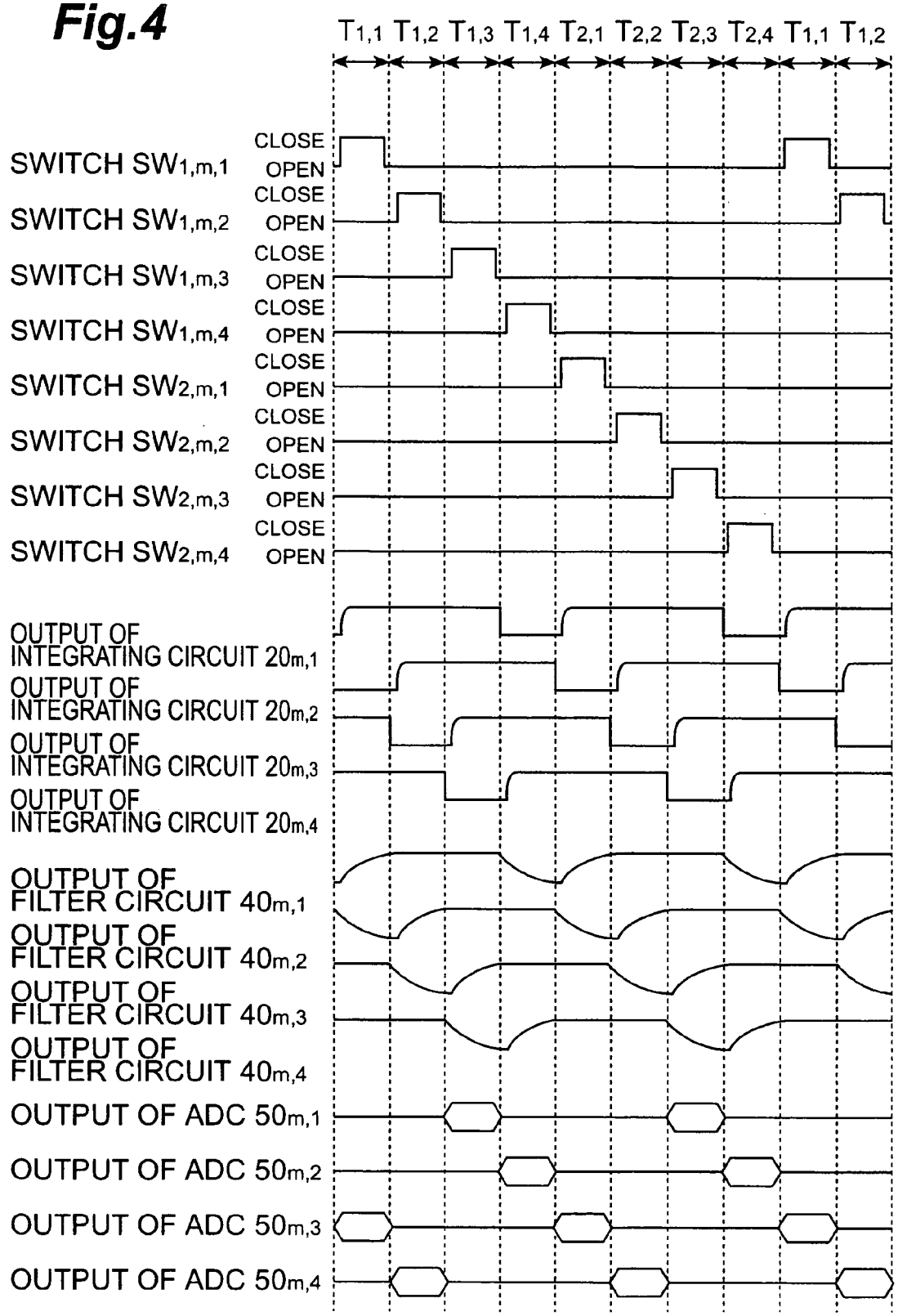
FIG. 4 is a timing chart for explaining operations of the photodetector 1 in accordance with the embodiment.

The operations of the photodetector 1 of the present embodiment shall now be described. The photodetector 1 of the present embodiment operates as described below under the control of control unit 60. FIG. 4 is a timing chart illustrating the operations of photodetector 1 of the present embodiment. With this photodetector 1, the first row to the M-th row operate in parallel.

In this figure, the opening/closing of switch $SW_{1,m,1}$, the opening/closing of switch $SW_{1,m,2}$, the opening/closing of switch $SW_{1,m,3}$, the opening/closing of switch $SW_{1,m,4}$, the opening/closing of switch $SW_{2,m,1}$, the opening/closing of switch $SW_{2,m,2}$, the opening/closing of switch $SW_{2,m,3}$, and the opening/closing of switch $SW_{2,m,4}$ are shown in that order from the top. Thereafter, the output voltage of integrating circuit $20_{m,1}$, the output voltage of integrating circuit $20_{m,2}$, the output voltage of integrating circuit $20_{m,3}$, the output voltage of integrating circuit $20_{m,4}$, the output voltage of filter circuit $40_{m,1}$, the output voltage of filter circuit $40_{m,2}$, the output voltage of filter circuit $40_{m,3}$, the output voltage of filter circuit $40_{m,4}$, the output digital value of A/D converter $50_{m,1}$, the output digital value of A/D converter $50_{m,2}$, the output digital value of A/D converter $50_{m,3}$, and the output digital value of A/D converter $50_{m,4}$ are shown.

Also as shown in this figure, the operations of photodetector 1 are divided into the eight periods of $T_{1,1}$, $T_{1,2}$, $T_{1,3}$, $T_{1,4}$, $T_{2,1}$, $T_{2,2}$, $T_{2,3}$, and $T_{2,4}$ that cycle. The duration T of each of these periods $T_{k,n}$ is fixed. Switch $SW_{1,m,1}$ is closed during period $T_{1,1}$, switch $SW_{1,m,2}$ is closed during period $T_{1,2}$, switch $SW_{1,m,3}$ is closed during period $T_{1,3}$, switch $SW_{1,m,4}$ is closed during period $T_{1,4}$, switch $SW_{2,m,1}$ is closed during period $T_{2,1}$, switch $SW_{2,m,2}$ is closed during period $T_{2,2}$, switch $SW_{2,m,3}$ is closed during period $T_{2,3}$, and switch $SW_{2,m,4}$ is closed during period $T_{2,4}$. Subsequently, such opening and closing of the switches are repeated.

Switch $SW_{1,m,1}$ is closed during period $T_{1,1}$. Also, prior to this period $T_{1,1}$, switch $SW_{20}$ of integrating circuit $20_{m,1}$ closes once and then opens and the output voltage of integrating circuit $20_{m,1}$ is thereby initialized. When switch $SW_{1,m,1}$ closes, the electric charges generated in photodiode $PD_{1,m,1}$ and accumulated in the junction capacitance portion until then are input via switch $SW_{1,m,1}$ and signal line $SL_{m,1}$ into integrating circuit $20_{m,1}$ and become accumulated in integrating capacitance element $C_{20}$ of integrating circuit $20_{m,1}$ and a voltage that is in accordance with the amount of the accumulated electric charges is output from integrating circuit $20_{m,1}$. After period $T_{1,1}$, the output voltage of integrating circuit $20_{m,1}$ is held until period $T_{1,3}$, and when switch $SW_{20}$ of integrating circuit $20_{m,1}$ closes at period $T_{1,4}$, the output voltage of integrating circuit $20_{m,1}$ is initialized.

The output voltage of integrating circuit $20_{m,1}$ is input into CDS circuit $30_{m,1}$. From this CDS circuit $30_{m,1}$ is output a voltage that is in accordance with the amount of fluctuation of the output voltage of integrating circuit $20_{m,1}$ in the fixed duration from period $T_{1,1}$ to $T_{1,2}$. The output voltage of CDS circuit $30_{m,1}$ is input into filter circuit $40_{m,1}$ and the thermal noise component is reduced. However, due to the filter characteristics of filter circuit $40_{m,1}$, the output voltage waveform of filter circuit $40_{m,1}$ is dulled in comparison to the output voltage waveform of CDS circuit $30_{m,1}$.

At the point at which the output voltage of filter circuit $40_{m,1}$ is stable, this voltage is A/D converted by A/D converter $50_{m,1}$ and a digital value is output from A/D converter $50_{m,1}$ in period $T_{1,3}$. The digital value that is output from A/D converter $50_{m,1}$ in period $T_{1,3}$ is in accordance with the amount of electric charges that have moved from the junction capacitance portion of photodiode $PD_{1,m,1}$ to integrating capacitance element $C_{20}$ of integrating circuit $20_{m,1}$ and thus in accordance with the intensity of light incident on photodiode $PD_{1,m,1}$ in period $T_{1,1}$.

Switch $SW_{2,m,1}$ is closed during period $T_{2,1}$. Prior to this period $T_{2,1}$, switch $SW_{20}$ of integrating circuit $20_{m,1}$ closes once and then opens and the output voltage of integrating circuit $20_{m,1}$ is thereby initialized. When switch $SW_{2,m,1}$ closes, the electric charges generated in photodiode $PD_{2,m,1}$ and accumulated in the junction capacitance portion until then are input via switch $SW_{2,m,1}$ and signal line $SL_{m,1}$ into integrating circuit $20_{m,1}$ and are accumulated in integrating capacitance element $C_{20}$ of integrating circuit $20_{m,1}$ and a voltage that is in accordance with the amount of the accumulated electric charges is output from integrating circuit $20_{m,1}$. After period $T_{2,1}$, the output voltage of integrating circuit $20_{m,1}$ is held until period $T_{2,3}$, and when switch $SW_{20}$ of integrating circuit $20_{m,1}$ closes at period $T_{2,4}$, the output voltage of integrating circuit $20_{m,1}$ is initialized.

The output voltage of integrating circuit $20_{m,1}$ is input into CDS circuit $30_{m,1}$. From this CDS circuit $30_{m,1}$ is output a voltage that is in accordance with the amount of fluctuation of the output voltage of integrating circuit $20_{m,1}$ in the fixed duration from period $T_{2,1}$ to $T_{2,2}$. The output voltage of CDS circuit $30_{m,1}$ is input into filter circuit $40_{m,1}$ and the thermal noise component is reduced. However, due to the filter characteristics of filter circuit $40_{m,1}$, the output voltage waveform of filter circuit $40_{m,1}$ is dulled in comparison to the output voltage waveform of CDS circuit $30_{m,1}$.

At the point at which the output voltage of filter circuit $40_{m,1}$ is stable, this voltage is A/D converted by A/D converter $50_{m,1}$ and a digital value is output from A/D converter $50_{m,1}$ in period $T_{2,3}$. The digital value that is output from A/D converter $50_{m,1}$ in period $T_{2,3}$ is in accordance with the amount of electric charges that have moved from the junction capacitance portion of photodiode $PD_{2,m,1}$ to integrating capacitance element $C_{20}$ of integrating circuit $20_{m,1}$ and thus in accordance with the intensity of light incident on photodiode $PD_{2,m,1}$ in period $T_{2,1}$.

In the above, the operations of switch $SW_{1,m,1}$, switch $SW_{2,m,1}$, integrating circuit $20_{m,1}$, CDS circuit $30_{m,1}$, filter circuit $40_{m,1}$, and A/D converter $50_{m,1}$, that is, the operations in the case where n is 1 was described. For n=2 to 4, the same operations are carried out with the timing of the operations being shifted.

A digital value that is in accordance with the intensity of light incident on photodiode $PD_{1,m,1}$ is thus output in period $T_{1,3}$, a digital value that is in accordance with the intensity of light incident on photodiode $PD_{1,m,2}$ is output in period $T_{1,4}$, a digital value that is in accordance with the intensity of light incident on photodiode $PD_{1,m,3}$ is output in period $T_{2,1}$, a digital value that is in accordance with the intensity of light incident on photodiode $PD_{1,m,4}$ is output in period $T_{2,2}$, a digital value that is in accordance with the intensity of light incident on photodiode $PD_{2,m,1}$ is output in period $T_{2,3}$, a digital value that is in accordance with the intensity of light incident on photodiode $PD_{2,m,2}$ is output in period $T_{2,4}$, a digital value that is in accordance with the intensity of light incident on photodiode $PD_{2,m,3}$ is output in the subsequent period $T_{1,1}$, and a digital value that is in accordance with the intensity of light incident on photodiode $PD_{2,m,4}$ is output in period $T_{1,2}$.

As described above, with photodetector 1 of the present embodiment, (K×M×N) photodiodes $PD_{k,m,n}$ are arranged in M rows and (K×N) columns in photodetection unit 10, and processes (electric charge accumulation, CDS, filtering, and A/D conversion) regarding the (K×N) photodiodes $PD_{k,m,n}$ (K=1 to K, n=1 to N) of each row are carried out successively at each time T. Meanwhile, each of the electric charge accumulation operation in integrating circuit $20_{m,n}$, the CDS operation in CDS circuit $30_{m,n}$, the filtering operation in filter circuit $40_{m,n}$, and the A/D conversion operation in A/D converter $50_{m,n}$ is carried out at each time (N×T).

With photodetector 1 of the present embodiment, the thermal noise component contained in the voltage output from integrating circuit $20_{m,n}$ is reduced by filter circuit $40_{m,n}$. Also, though the voltage waveform output from filter circuit $40_{m,n}$ is dulled, the operations from the electric charge accumulation in integrating circuit $20_{m,n}$ to the A/D conversion in A/D converter $50_{m,n}$ are carried out at each time (N×T), and the voltage that is output from filter circuit $40_{m,n}$ is A/D converted by A/D converter $50_{m,n}$ at the point at which it has stabilized. Thus with this photodetector 1, the S/N ratio of photodetection can be improved while maintaining high speed of photodetection. Also, since the S/N ratio of photodetection can be improved without making large the input transistor's transconductance $G_m$ of amplifier $A_{20}$ included in integrating circuit $20_{m,n}$, increase of the consumption power of amplifier $A_{20}$ is restrained and the problem of heat generation is reduced.

Also, since by the provision of CDS circuit $30_{m,n}$, the offset fluctuation of amplifier $A_{20}$ of integrating circuit $20_{m,n}$ is eliminated by CDS circuit $30_{m,n}$, the S/N ratio of photodetection is improved from this point as well. Though CDS circuit $30_{m,n}$ also contains amplifier $A_{30}$, the thermal noise generated at this amplifier $A_{30}$ is minute in comparison to the thermal noise generated at amplifier $A_{20}$ included in integrating circuit $20_{m,n}$.

Also, since by the provision of A/D converter $50_{m,n}$, the photodetection data obtained by photodetector 1 are output as digital values, storage and image processing of the photodetection data can be carried out readily Also, since the requirement of high-speed processing is relaxed in terms of A/D converter $50_{m,n}$, the increase of consumption power at A/D converter $50_{m,n}$ is also restrained.

Furthermore, since (K×M×N) photodiodes $PD_{k,m,n}$ are arranged in M rows and (K×N) columns, each photodiode $PD_{k,m,n}$ is positioned at the position of the m-th row and the (n+(k−1)N)-th column, and the processes (electric charge accumulation, CDS, filtering, and A/D conversion) regarding photodiodes $PD_{k,m,n}$ are carried out in the order of alignment in each column for each row, the storage and image processing of the photodetection data obtained by the photodetector 1 are facilitated from this point as well.

Figure 5:
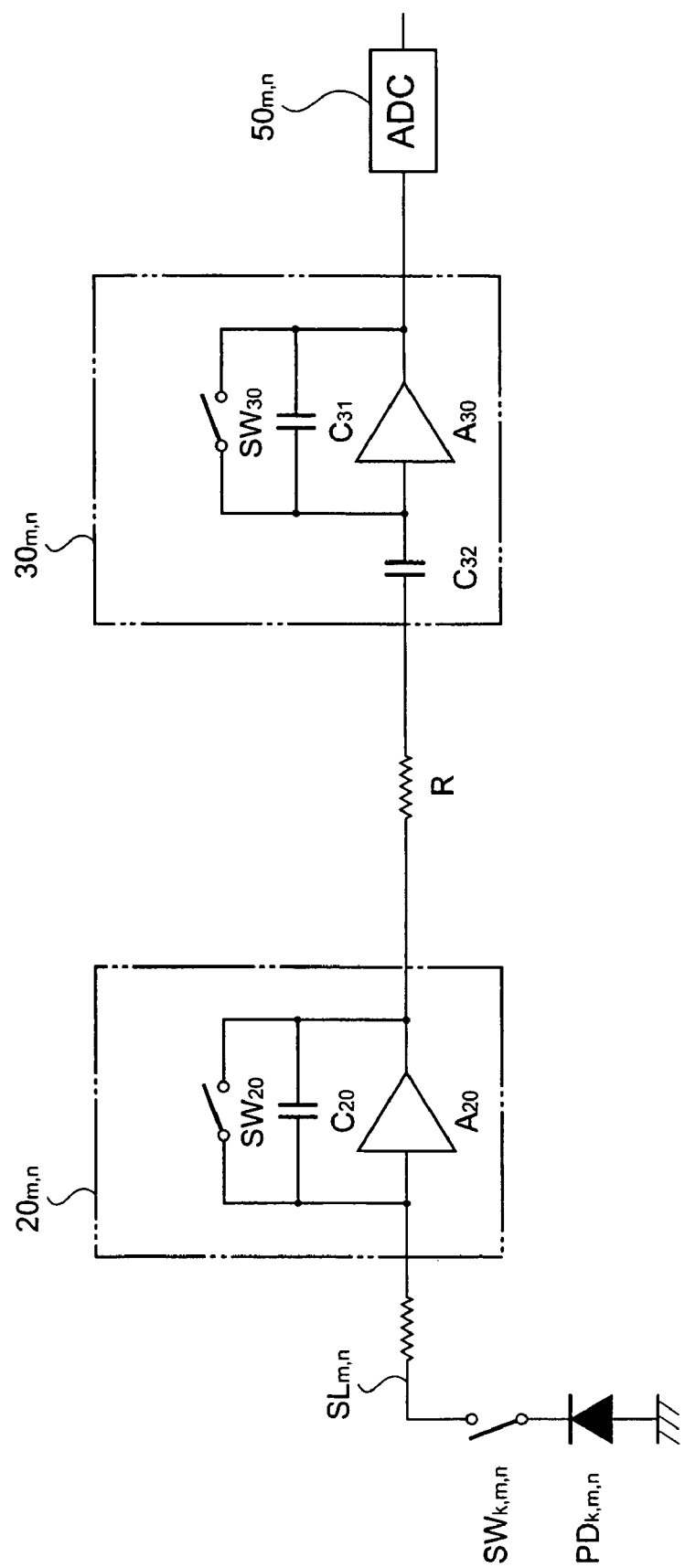
FIG. 5 is a diagram of another circuit example of photodetector 1 of the embodiment.

Though in the above-described embodiment, filter circuit $40_{m,n}$ was arranged at a stage subsequent CDS circuit $30_{m,n}$, the filter circuit may instead be arranged between integrating circuit $20_{m,n}$ and CDS circuit $30_{m,n}$. Though the filter circuit that is arranged between integrating circuit $20_{m,n}$ and CDS circuit $30_{m,n}$ may have the same arrangement as filter circuit $40_{m,n}$ described above, it may instead be arranged from just a resistance element R as shown in FIG. 5. This resistance element R can also act as a low-pass filter.

INDUSTRIAL APPLICABILITY

As has been described in detail above, with the photodetector of the present invention, for each value of m and each value of n, the electric charges that are respectively generated in accordance with the incidence of light in K photodiodes $PD_{k,m,n}$ (k=1 to K) are successively input and accumulated in a single integrating circuit and a voltage that is in accordance with the amount of the accumulated electric charges is output from the integrating circuit. The thermal component that is contained in the voltage output from each integrating circuit is reduced by a filter circuit, and the voltage after reduction of the thermal noise component is output from the filter circuit. Both a good S/N ratio and a high speed can thus be secured with this photodetector.

The invention claimed is:

1. A photodetector comprising:

(K×M×N) photodiodes $PD_{k,m,n}$ (K being an integer of no less than 2; k being integers of no less than 1 and no more than K; M being an integer of no less than 1; m being integers of no less than 1 and no more than M; N being an integer of no less than 2; and n being integers of no less than 1 and no more than N), each generating an electric charge by an amount corresponding to an intensity of light incident thereon;

(M×N) integrating circuits, one of each being provided in correspondence to K photodiodes $PD_{k,m,n}$ (k=1 to K) among the (K×M×N) photodiodes $PD_{k,m,n}$ and each successively inputting and accumulating the electric charges generated at the K photodiodes $PD_{k,m,n}$ (k=1 to K) and outputting a voltage that is in accordance with the amount of the accumulated electric charges; and (M×N) filter circuits, one of each being provided in correspondence to each of the (M×N) integrating circuits and each reducing the thermal noise component contained in the voltage output from the corresponding integrating circuit and outputting the voltage after reduction of the thermal noise component, wherein the (K×M×N) photodiodes $PD_{k,m,n}$ are arranged in M rows and (K×N) columns either two-dimensionally (when M=2) or one-dimensionally (when M=1), with each photodiode $PD_{k,m,n}$ being positioned at the position of the m-th row and (n+(k−1)N)-th column, switches $SW_{k,m,n}$ are provided in a one-to-one correspondence with respect to photodiodes $PD_{k,m,n}$ and are arranged between the photodiodes $PD_{k,m,n}$ and signal lines $SL_{m,n}$, each set of K photodiodes $PD_{k,m,n}$ (k=1 to K) is connected via the corresponding switches $SW_{k,m,n}$ to a signal line $SL_{m,n}$, each signal line $SL_{m,n}$ is connected to an input end of an integrating circuit, and switches $SW_{k,m,n}$ on the same row are connected to the same control line $CL_{k,n}$ and the opening/closing of each row of switches $SW_{k,m,n}$ is controlled together by a control signal that is transmitted via the control line $CL_{k,n}$.

2. The photodetector according to claim 1, further comprising CDS circuits, each being arranged between said integrating circuit and said filter circuit, inputting the voltage output from the integrating circuit, and outputting a voltage expressing the fluctuation of the input voltage over a fixed time.

3. The photodetector according to claim 1, further comprising A/D converters, each inputting the voltage output from said filter circuit, performing A/D conversion on this voltage, and outputting a digital value that is in accordance with this voltage.

* * * * *